April 10, 1951  J. P. SCONE  2,547,981
CUTTER SHARPENING MACHINE
Filed Sept. 2, 1948  7 Sheets-Sheet 1

INVENTOR.
John P. Scone
BY
Carlson, Pitzner, Hubbard & Wolfe
ATTORNEYS

April 10, 1951

J. P. SCONE 2,547,981

CUTTER SHARPENING MACHINE

Filed Sept. 2, 1948

INVENTOR.
John P. Scone
BY
Carlson, Pitzner, Hubbard & Wolf
ATTORNEYS

INVENTOR.
John P. Scone

Patented Apr. 10, 1951

2,547,981

UNITED STATES PATENT OFFICE 2,547,981

CUTTER SHARPENING MACHINE

John P. Scone, Rockford, Ill., assignor to Barber-Colman Company, Rockford, Ill., a corporation of Illinois Application September 2, 1948, Serial No. 47,435

20 Claims. (Cl. 51—95)

This invention relates to the automatic sharpening of rotary cutters by a machine of the type in which the cutter is reciprocated back and forth across a grinding wheel and indexed after each reciprocation to position the next tooth or row of teeth for engagement with the grinding wheel. After the cutter has thus been indexed step by step through a full revolution and each tooth has been ground off once, the cutter and wheel are fed toward each other preparatory to repeating the operation to remove additional stock from the cutter teeth.

The primary object of this invention is to provide a novel and simple mechanism for effecting such relative feeding of the cutter and grinding wheel.

Another object is to combine the feeding mechanism with a second feeding mechanism by which the cutter is turned progressively as it moves past the grinding wheel to impart a desired lead to the cutter tooth.

A more detailed object is to produce the feeding motion above referred to through the use of a worm or screw which is turned to produce one feed motion and moved endwise so as to be used as a rack to produce the other feed motion.

A further object is to provide a novel mechanism for counting the step-by-step feed movements of the cutter, effecting the increment feed, and automatically reconditioning the counting mechanism for another sharpening cycle.

Still another object is to provide a novel mechanism for automatically disabling the sharpening machine after a pre-selected amount of stock has been removed from each cutter blade in a plurality of repeated cycles.

A further object is to communicate the feed and indexing movements to the cutter by novel mechanism which may operate independently or simultaneously.

Other objects and advantages of the invention will become apparent from the following detailed description taken in connection with the accompanying drawings, in which Figure 1 is a fragmentary front elevational view of a cutter sharpening machine embodying the novel features of the present invention.

Figs. 2, 3, and 4 are fragmentary sectional views taken respectively along the lines 2—2, 3—3, and 4—4 of Fig. 1.

Figure 1:
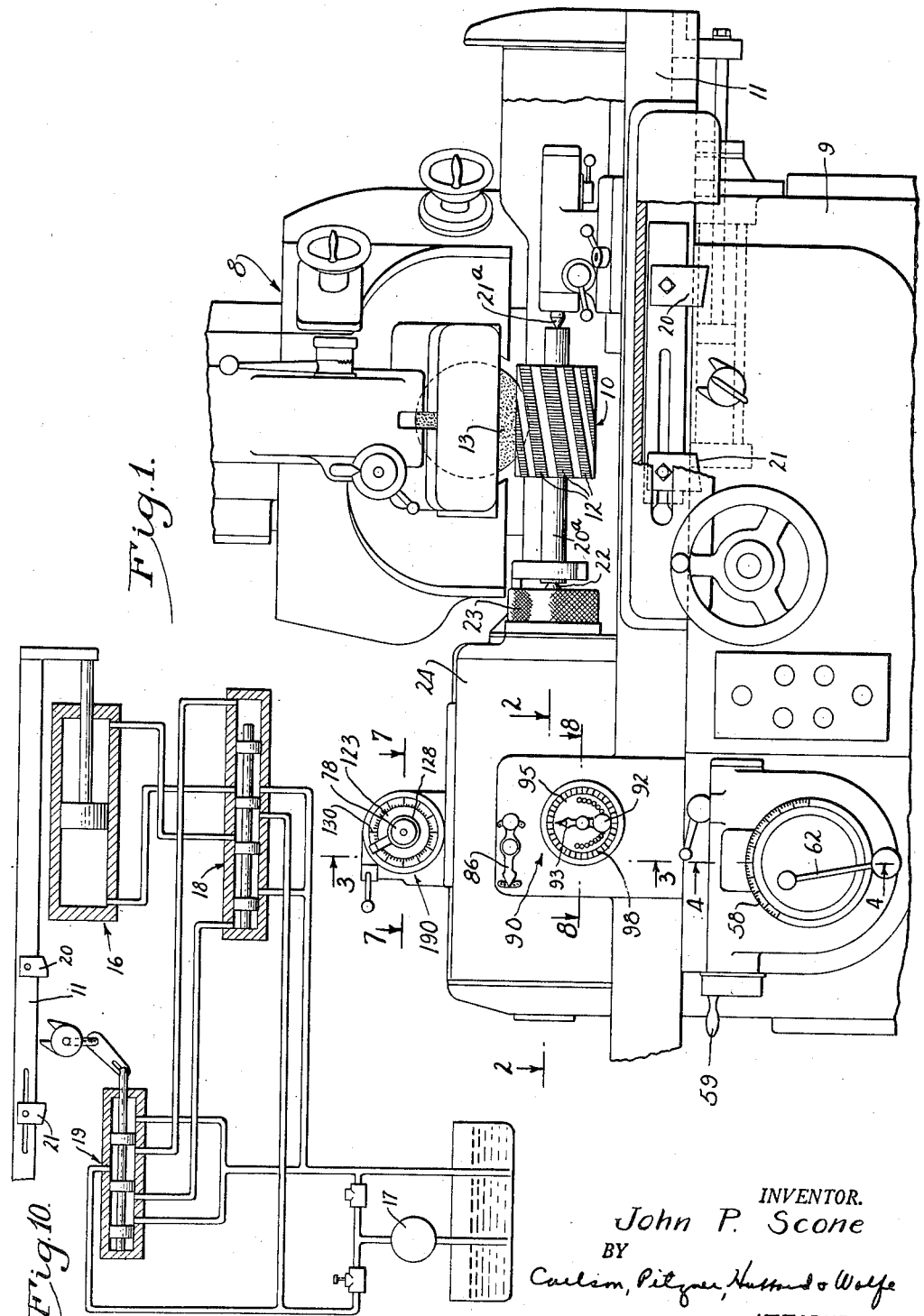
Figure 7:
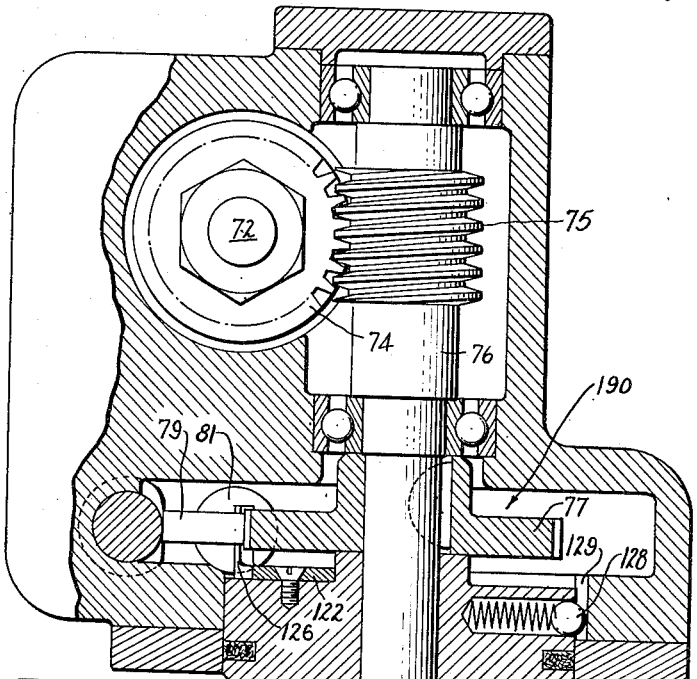
Figure 8:
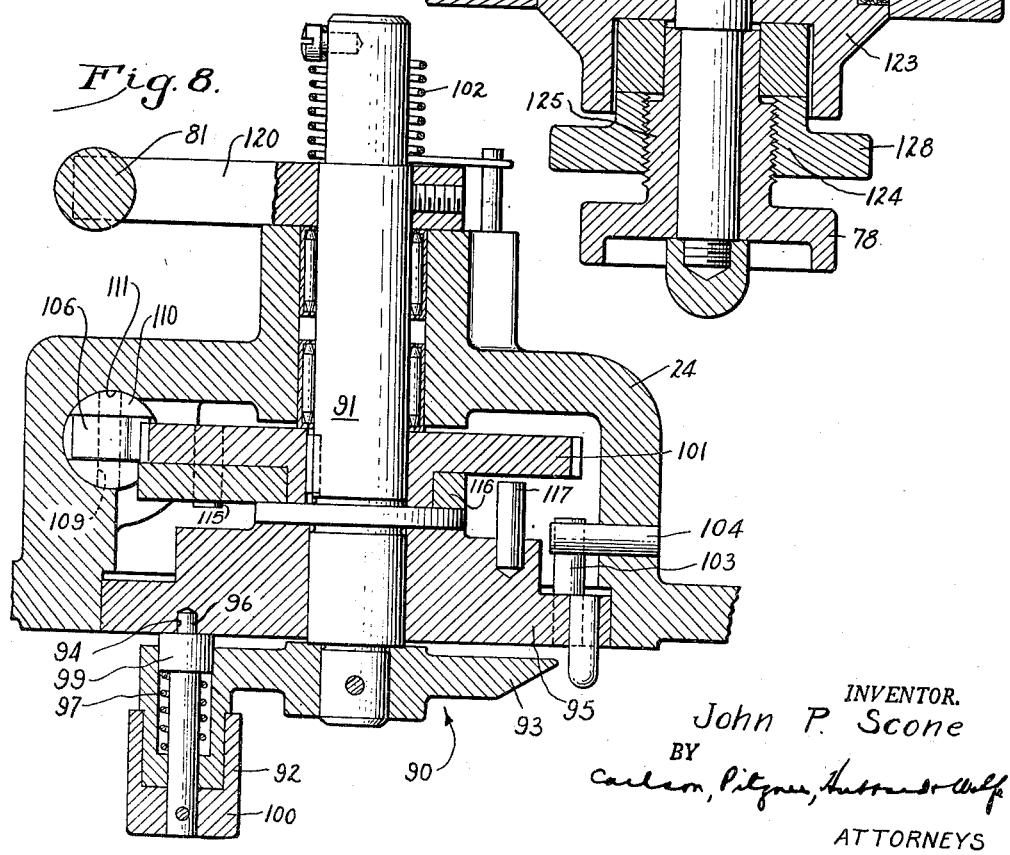

Figs. 7 and 8 are fragmentary sectional views taken respectively along the lines 7—7 and 8—8 of Fig. 1.

Figure 9:
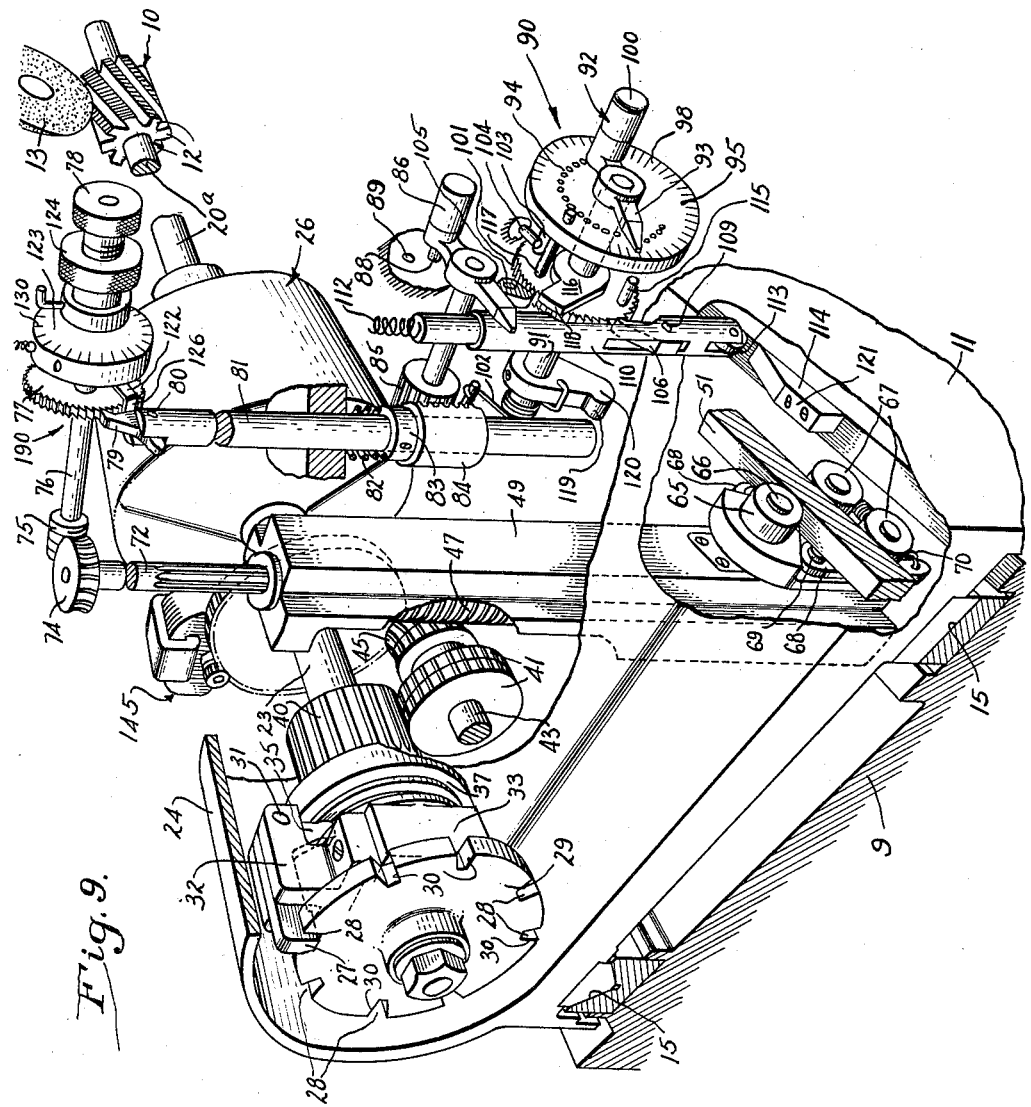

Fig. 9 is a perspective view showing the main operating parts.

Fig. 10 is a hydraulic circuit diagram.

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

In the machine shown in the drawings for purposes of illustration, sharpening of the cutter such as a gear hob 10 is effected during a series of reciprocations of a table 11 between each of which the cutter is indexed, counterclockwise as viewed in Fig. 9, to bring a succeeding row of teeth 12 into operative association with the conical face of a grinding wheel 13 which is positioned to engage the tooth faces along the desired plane. The gashes between the rows of cutter teeth may as shown be inclined as a desired lead angle relative to the cutter axis.

Figure 3:
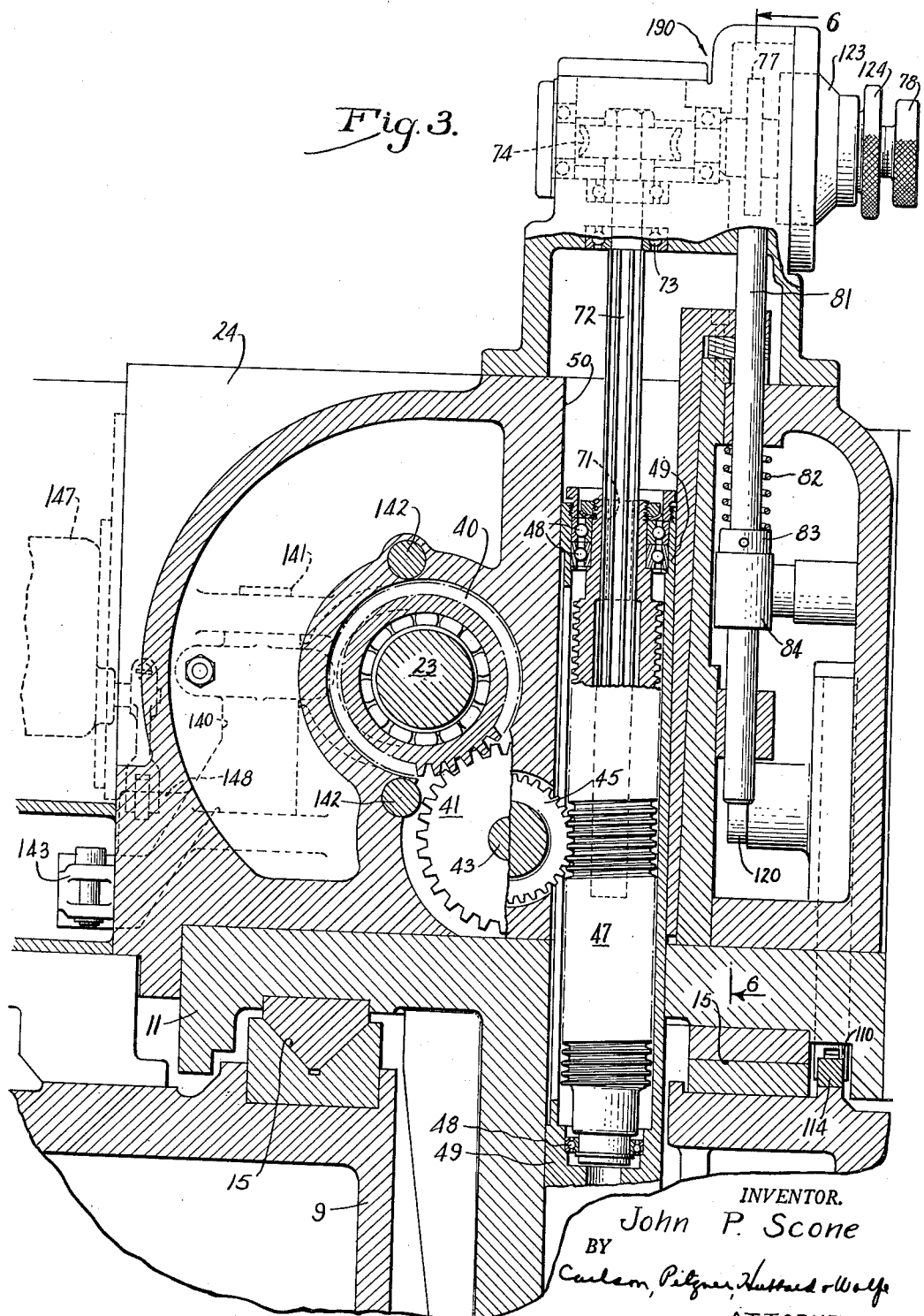

The grinding wheel is mounted adjustably on a standard 8 upstanding from the machine bed 9 behind the table and is adapted for various adjustments to accommodate cutters of different sizes and to produce various cutting angles on the teeth thereof. Herein the table is slid back and forth on bedways 15 (Fig. 3) by a fluid actuator 16 (Fig. 10) to which pressure fluid from a source 17 is admitted under the control of a relay valve 18 which in turn is actuated by fluid pressure admitted through a reversing valve 19. The latter is adapted to be shifted between opposite limit positions by dogs 20 and 21, one of which is adjustable along the table.

Figure 2:
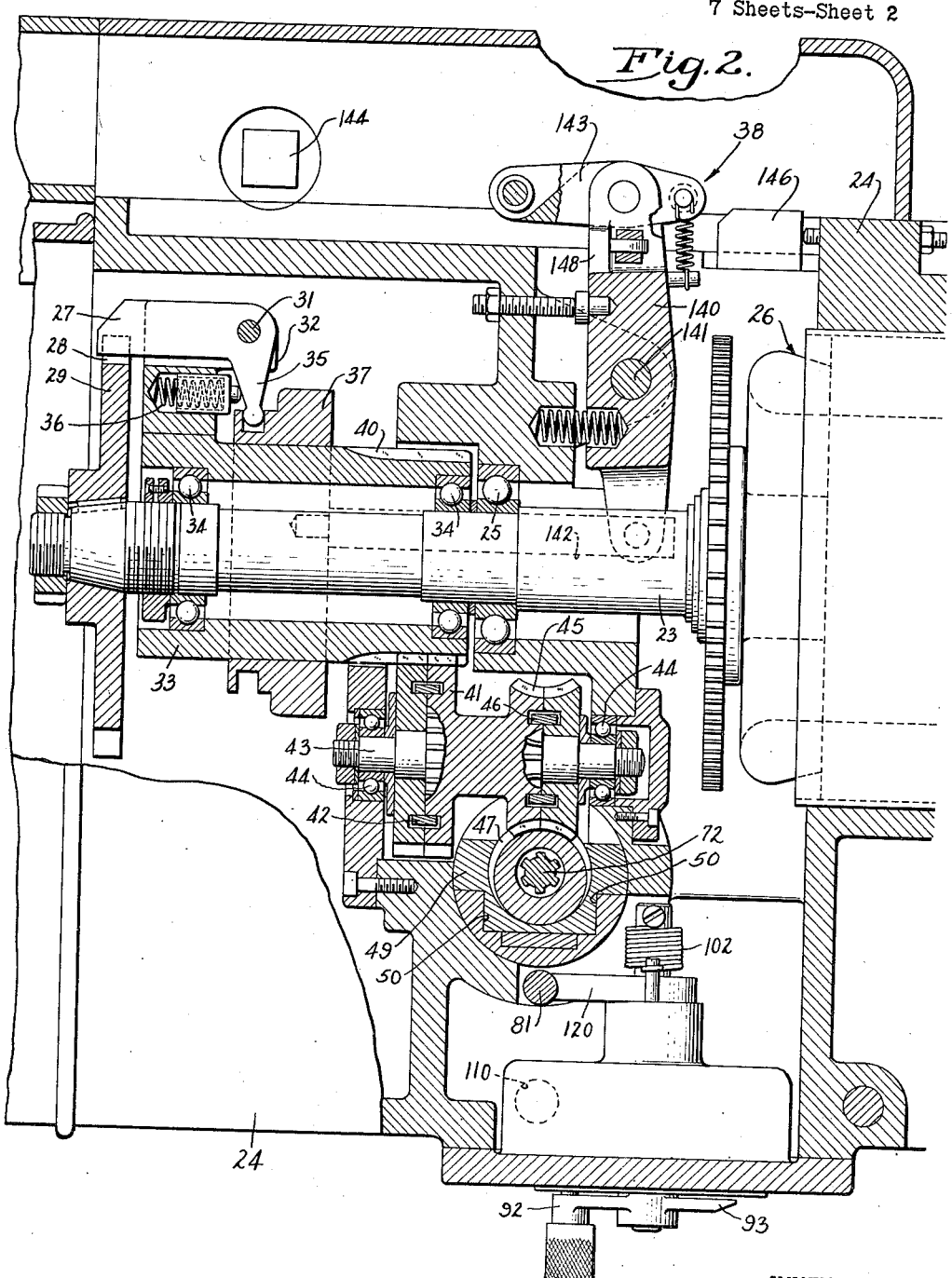

The cutter to be sharpened is keyed to a horizontal arbor 20ª disposed parallel to the table motion and supported at one end on a tailstock 21ª (Fig. 1) on the right-hand end of the table 11. The other end of the arbor is supported by a center 22 and coupled by a drive dog to a spindle 23 which projects through a headstock frame 24 and is journaled in spaced bearings, one of which is indicated at 25 (Fig. 2). The headstock is secured to the left-hand end portion of the table 11.

Power for turning of the spindle 23 to index the cutter tooth by tooth is preferably derived from an electric torque motor 26 (Figs. 2 and 9)

in order to permit of independent turning of the spindle and cutter by the lead and increment feed mechanisms later to be described. The rotor of the motor is keyed to the spindle and the stator is secured in the headstock housing 24. The extent of the indexing movement is determined by entry of a latch dog 27 (Figs. 2 and 9) into outwardly opening notches 28 around the periphery of a plate or disk 29 keyed to the outer end of the spindle 23. The trailing walls 30 of the notches are spaced accurately to correspond to the angular spacing of the teeth 12 on the cutter to be sharpened, and the dog 27 is adapted to fit closely in the roots of the notches so that the cutter is positioned precisely when the dog is seated in a notch.

The dog is pivoted on a crosspin 31 mounted on the outer end of an arm 32 on a sleeve 33 rotatably supported through bearings 34 on the spindle 23. An inwardly projecting arm 35 on the dog is urged by a spring 36 (Fig. 2), in a direction to swing the dog inwardly and thus cause it to enter the next notch 28 presented thereto in the turning of the index plate 29 following withdrawal of the dog to initiate an indexing movement. Such withdrawal of the latch dog is effected by outward axial shifting of a ring 37 (Fig. 2) loose on the sleeve 33 and adapted to be actuated by a mechanism indicated generally at 38 and forming the subject matter of an application of Stafford M. Ransome, Serial No. 43,882, filed August 12, 1948. In general, the index control mechanism comprises a lever 140 (Fig. 2) pivoted at 141 on the table with one end connected by rods 142 to the ring 37 and the other end carrying a lever 143 which, in the final return motion of the table, encounters a fixed stop 144 thereby causing the lever 140 to be shifted and the latch dog 27 to be withdrawn. Simultaneously a switch 147 (Fig. 3) is actuated by a lug 148 on the lever 140 to energize the motor 26 and a magnetic drag brake 145 (Fig. 9) and cause the spindle to be turned. Before the next notch 28 is presented to the latch dog 27, the latter is released by the engagement of a cam 146 on the table with the end of the lever 143 rocking the latter out of engagement with the stop 144 so as to permit of entry of the latch dog 27 by its spring 36.

The motion of the table 11 itself may be utilized advantageously to turn the cutter during the table reciprocations in acordance with the lead of the cutter gashes and also after each revolution of the cutter whereby to position the teeth for removal of additional stock. In accordance with the present invention, these coarse and fine feeding motions are derived through separate and independently operable table actuated mechanisms and applied to the spindle through the intermediary of the indexing coupling including the latch dog 27 while the latter is entered in a notch of the index plate. For this purpose, the inner end of the sleeve is formed with spur teeth 40 which mesh with gears 41 coupled together by an anti-backlash spring 42, one of the gears being integral with a horizontal shaft 43 which is journaled in bearings 44 on the headstock housing.

A worm wheel 45 (Figs. 2, 3 and 9) is formed by one part which is integral with the other end of the shaft 43 and a second part is loose on the shaft and coupled by an anti-backlash spring 46 to the first part of the wheel. The teeth of the worm wheel mesh with a worm 47 in the form of an elongated screw extending vertically and tangentially of the worm wheel 45 and journaled at its upper and lower ends in bearings 48 mounted in opposite ends of a bar 49 which is slidable along a guideway 50 carried by the headstock housing 24 and extending transversely of the table motion and preferably vertically. Thus, the screw 47, while meshing with the worm wheel, is adapted for both rotary and endwise movements during each of which the spindle 23 is turned to feed the cutter teeth relative to the grinding wheel. It will be observed that during such endwise movement, the screw acts as a rack while the wheel 45 serves as a pinion.

Figure 4:
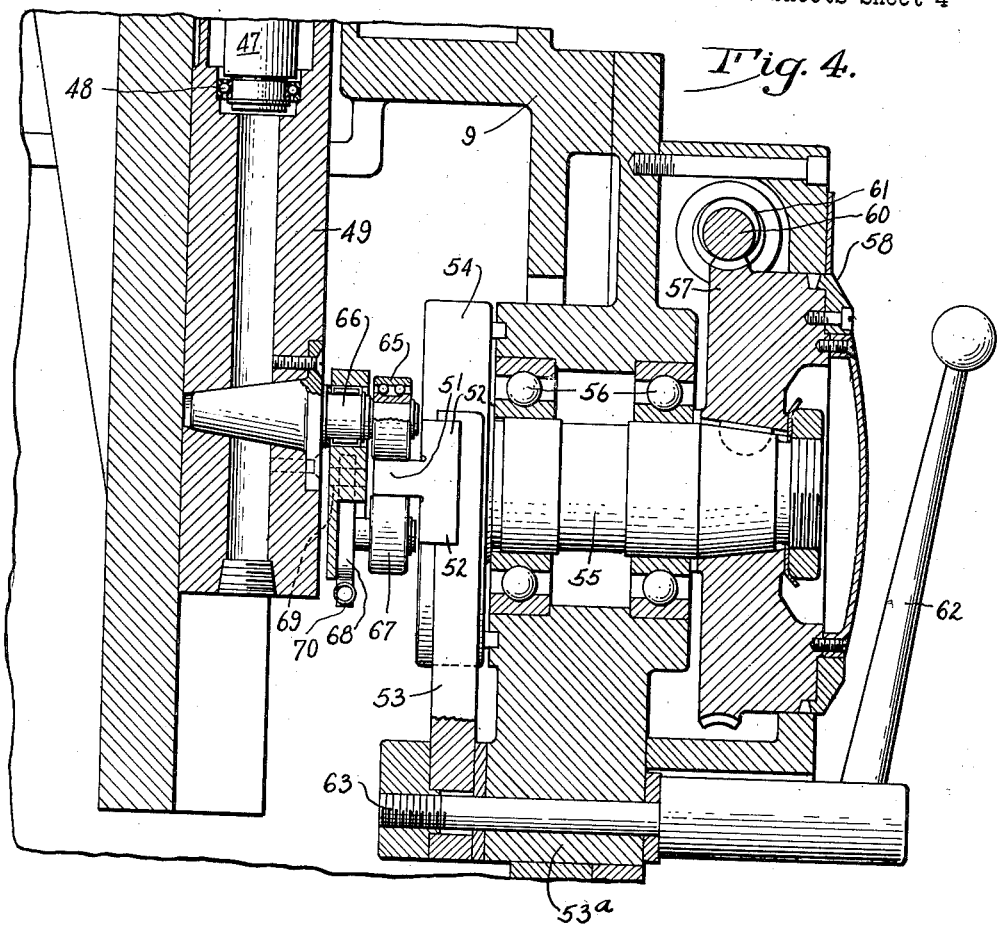
Figure 5:
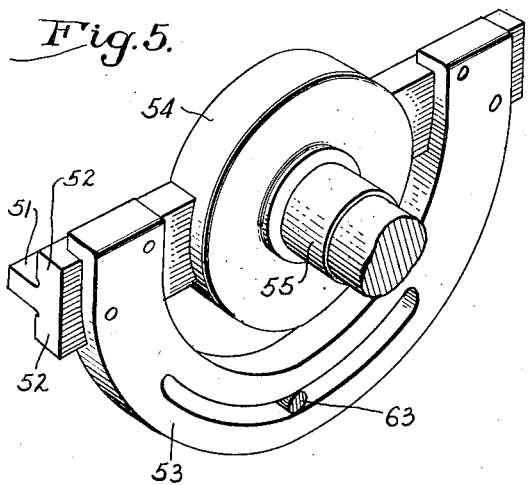
Fig. 5 is a fragmentary perspective view of a feed control cam.

Means is provided for moving the slide 49 up and down progressively during the advance and retraction of the table and with a ratio of motion transmission such as to impart the desired lead angle to the faces of the cutter teeth. Herein, this motion is effected by an elongated cam or so-called tangent bar 51 (Figs. 4, 5 and 9) which is mounted on the lower front portion of the machine bed 9 for adjustment to different inclinations according to the lead on the cutter to be sharpened. Herein, the bar is formed with flanges 52 which are set in and bolted to the ends of a semi-circular segment 53 concentric with a hub 54 fast on a shaft 55 and also secured to the bar flanges. The shaft is journaled in bearings 56 (Fig. 4) in the machine bed 9 and the outer end is keyed to a worm wheel 57 whose outer end is graduated as at 58 to indicate the angular position of the tangent bar 51. Angular adjustment of the latter in either direction away from the horizontal may be effected by turning a hand crank 59 which is on a shaft 60 carrying a worm 61 meshing with the worm wheel 57. The selected adjustment of the bar 51 may be retained by turning a handle 62 to tighten a screw 63 and clamp the segment 53 against a stationary part 53a which is bolted to the machine bed.

The bar 51 thus supported on the bed acts as a cam on a follower roller 65 (Figs. 4 and 9) journaled on a stud 66 which projects forwardly from the lower end portion of the slide 49 and coacts with the upper side of the bar. Such contact is maintained by two rollers 67 engageable with the underside of the bar and mounted on arms 68 pivoted at 69 on the slide 49. A spring 70 stretched between the arms draws the rollers 67 toward each other thus urging the bar 51 upwardly against the follower 65.

It will be observed that as the follower roller 65 moves back and forth with the table along the tangent bar 51, the slide 49 is raised and lowered in accordance with the inclination of the bar thus turning the cutter spindle first counterclockwise as viewed in Fig. 9, and then clockwise when the bar is inclined downwardly and toward the right-hand end of the machine. Such turning of the cutter while one row of teeth is engaging the grinding wheel causes the cutting faces of the teeth to be ground off with the desired lead.

Turning of the spindle 23 by a very small increment to feed the cutter teeth toward the grinding wheel 13 preparatory to repeating the sharpening operation in another step-by-step revolution of spindle 23 is effected by turning the screw 47 through the proper small angle in the final return motion of the table after the table has executed a numer of strokes equal to the number of rows of teeth on the cutter being sharpened. Preferably, this is accomplished through two ratchet mechanisms 90 and 190 (Fig.

9I, one of which functions to count the number of indexing movements of the cutter spindle 23 and then actuate the second ratchet mechanism 190 which registers the accumulated amount of the spindle feed. To the foregoing ends, the screw 47 is made hollow and spline connected at 71 (Fig. 3) to the lower end portion of a shaft 72 journaled in a bearing 73 in the upper part of the headstock housing. Fast on the spline shaft is a worm wheel 74 meshing with a worm 75. The latter is on a horizontal shaft 76 which carries a ratchet wheel 77 and at its forward exposed end carries a knob 78 by which the shaft may be turned to permit of manual feeding of the cutter.

The ratchet wheel 77 is engaged by and advanced in the upward movement of a pawl 79 (Figs. 6, 7 and 9) pivoted at 80 on the upper end of a rod 81 and urged toward the ratchet teeth by a spring 87. The rod is slidable vertically in the housing 24 and normally urged downwardly by a spring 82 to a position determined by engagement of a collar 83 on the rod 81 and a stop 84. The latter encircles the bar and is formed with rack teeth meshing with a pinion 85 which may be turned by a hand crank 86 to raise or lower the stop and thus adjust the length of the vertical stroke of the pawl. A projection 88 on the crank is adapted to enter any one of a plurality of holes 89 and thus retain the selected position of the stop.

Raising of the rod 81 to actuate the pawl and impart an increment feed to the spindle 23 and cutter is effected through the mechanism 90 (Figs. 6, 8 and 9) which is actuated by the table motions and which functions to count the number of index steps of the cutter spindle and raise the rod 81 after a preselected number of indexing steps which number may, if desired, equal the number of rows of teeth on the cutter. The counting mechanism includes a horizontal shaft 91 journaled in the housing 24 with its outer end projecting from the latter and carrying a hand crank 92 having a pointer 93 which projects radially across an arcuate row of holes 94 uniformly spaced around an indicator disk 95 having numbered graduations 98 around its peripheral edge. The disk is loose on the shaft but is normally coupled thereto by the pin 96 on the end of a plunger 99 mounted on the crank 92 and urged toward the disk by a spring 97 (Fig. 8). By pulling outwardly on a knob 100, the plunger 99 and the pin 96 may be retracted to disconnect the disk and shaft and permit relative angular adjustment between the two.

Fast on the shaft 91 is a ratchet wheel 101 whose teeth are pitched to correspond to the spacing of the holes 94 on the indicator disk 95. A torsion spring 102 tends to turn the shaft 91 and ratchet 101 counterclockwise as viewed in Fig. 9, and the extent of this motion is limited as shown by engagement of a pin 103 on the disk 95 with a stop 104 fixed on the housing 24. Such turning of the ratchet wheel is permitted upon withdrawal of a retaining pawl 105 which is urged by a spring 107 (Fig. 6) into engagement with the ratchet teeth to hold the wheel against counterclockwise turning while permitting the wheel to be advanced clockwise in successive upward motions of a pawl 106. The latter is urged toward the ratchet teeth by a spring 108 (Fig. 6) and is pivoted at 109 on a rod 110 slidable in a vertical guideway 111 on the housing and urged downwardly by a spring 112. The guideway 111 is positioned to locate a roller 113 on the lower end of the rod 110 for engagement with the incline on a cam 114 fixed to the machine bed 9 and operable to raise the rod 110 in the final part of the return stroke of the table to the left as viewed in Fig. 1, this being after the cutter has passed out of engagement with the grinding wheel 13 and before the reversing valve 19 has been actuated to reverse the motion of the table 11. This may be before or while the latch dog 27 is withdrawn to initiate indexing of the cutter spindle 23.

Figure 6:
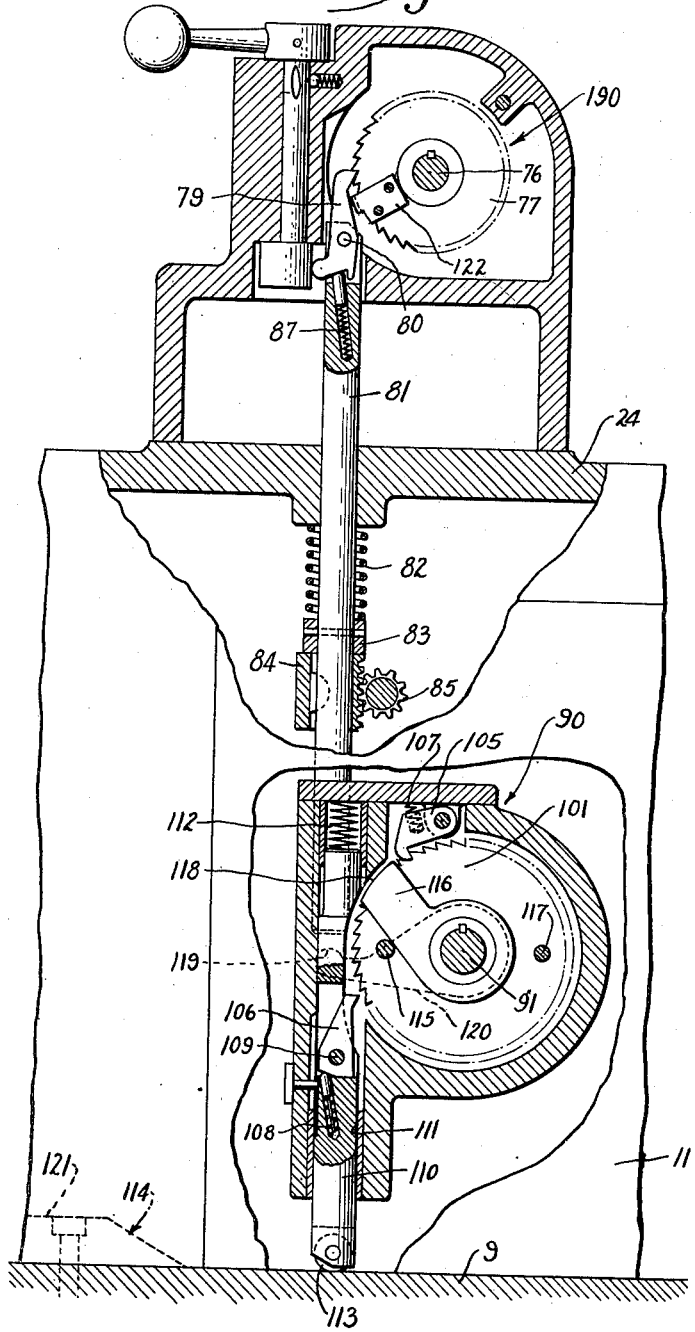
Fig. 6 is a fragmentary sectional view taken along the line 6—6 of Fig. 3.

After the ratchet wheel 101 and the shaft 91 have been advanced a number of steps predetermined by the selected position of the crank 92 relative to the indicator disk 95, a pin 115 rigid with the ratchet wheel 101 will, as shown in Fig. 6, come into engagement with a finger 116 which is loose on the shaft 91 adjacent the ratchet wheel. Then, in the next return stroke of the table and advance of the ratchet wheel by the pawl 106, the finger 116 will turn with the ratchet wheel and its outer end 118 will be carried into engagement with the pawl 105 so as to cam the latter upwardly and out of engagement with the ratchet teeth, the finger 116 being retained in this position by engagement of the pawl with the end surface 118 of the finger.

With the retaining pawl thus disabled, the ratchet wheel will be released for counterclockwise turning by the torsion spring 102 as soon as the actuating pawl 106 has been lowered out of engagement with the ratchet teeth which occurs in the initial part of the next advance of the table 11. With the shaft 91 thus released, the spring 102 turns the then uncoupled ratchet and indicator disk 95 counterclockwise to the starting positions shown in Fig. 9 as determined by engagement of the pin 103 with the stop 104. In the final part of this motion, a pin 117 on the disk 95 strikes the finger 116 and kicks it counterclockwise out of engagement with the pawl 105 which then swings into engagement with the ratchet teeth. The counting mechanism 90 is now fully reset and thus adapted to again start counting the indexing movements of the cutter in the next cycle of the machine.

In the step-by-step clockwise advance of the shaft 91 as described above, the rod 81 and the feed pawl 79 thereon remain idle until the final step during which the retaining pawl 105 is released as described above. At this time, the lower rounded end 119 of an arm 120 fast on the shaft 91 encounters the lower end of the rod 81 and raises the latter during the remainder of the upward stroke of the actuating pawl 106 which occurs as the roller 113 rides up the incline and onto the top 121 of the stationary cam 114. As described above, this takes place in the final retracting motion of the table 11 after the cutter 10 has passed out of engagement with the grinding wheel 13. As a result of this advance of the pawl 79, the screw 47, the sleeve 33, the index plate 29 and the cutter spindle 23 are turned through a very small increment, for example, .0006 of an inch, thereby positioning the cutter transversely of the grinding wheel 13 for removal of an additional amount of stock from the cutter teeth in the successive passes of the cutter across the wheel.

Provision is made for registering the accumulated feed of the cutter spindle and for automatically disabling the increment feed mechanism after a predetermined total amount of stock has been removed from the cutter teeth during indexing of the spindle through a plurality of revolutions. The latter is accomplished by retracting the pawl 79 after a selected feed has occurred and maintaining the pawl disabled in the event that the machine is allowed to repeat its cycles. For this purpose, an arm 122 (Figs. 6, 7 and 9) is secured to a disk 123 which is loose on the shaft 76 adjacent the ratchet wheel 77 and is adapted to be clamped frictionally to the the latter by turning a nut 124 to advance the latter along a screw 125 fixed to the outer end of the shaft 76. The outer end 126 of the arm 122 is bent across the periphery of the ratchet 77 so as to engage the pawl 79 and cam it out of engagement with the ratchet teeth when the disk 123 has turned clockwise to a predetermined position. At this time, a spring loaded detent 128 (Fig. 7) on the disk 123 enters a notch 129 in the housing around the disk and holds the latter and the finger 122 in a pawl-releasing position. The pawl and the feed mechanism are thus held inactive until the disk 123 is reset preparatory to sharpening a new cutter.

Such resetting is effected by first turning a knob 128 on the nut 124 along the screw 125 to unclamp and uncouple the disk 123 from the ratchet wheel 77 to permit of independent turning of the disk and the pawl-disabling finger 122. Then, by turning the disk counterclockwise, the finger 122 may be backed away from the pawl 79 and brought to a position corresponding to the total feed to be used in sharpening another cutter. The amount of such feed may be gauged by observing a scale 130 on the disk 123.

Operation

After mounting a cutter to be sharpened on the table 11, the machine above described is conditioned for automatic operation by first positioning the hand crank 92 around the disk until the pointer 93 indicates the number of rows of teeth around the cutter. Next, the tangent bar 51 is set by turning of the crank 59 at the inclination corresponding to the lead or gash angle to be produced. Then, by adjustment of the crank 86, the stop 84 is positioned according to the amount of stock to be removed in each pass of the cutter across the wheel 13. Next, the cutter is turned through the medium of the knob 78 until the teeth of one row are brought into position for light engagement with the wheel 13. Finally, the disk 123 is set for the desired amount of total feed as indicated on the scale 130 and then clamped to the ratchet wheel 77 by turning the knob 124.

Reciprocation of the table is now initiated whereupon the teeth are ground off in successive reciprocations of the table during each of which the cutter is turned back and forth by the action of the tangent bar 51. After the cutter has been indexed step by step through one full revolution and each row of teeth has thus been ground off, the counting mechanism 90 is actuated to ratchet the cutter spindle 23 forwardly one increment and thus position the cutter teeth for the removal of additional stock in the succeeding revolution of step-by-step indexing movement.

Finally, when the total stock removed from each row of teeth equals the amount for which the disk 123 is set, the pawl 79 is retracted thereby disabling the feed mechanism so as to interrupt the sharpening operation even though the table reciprocation is allowed to continue.

It will be apparent from the foregoing that the improved cutter sharpener is extremely versatile and may, with simple adjustments, be adapted to sharpen cutters of various sizes and having widely varying lead and cutting angles. At the same time, great precision is achieved in the automatic positioning of the cutter relative to the grinding wheel. The indexing, feed, and lead motions are effected by mechanisms which operate independently and yet remain permanently connected to the cutter spindle so that their operation may be derived from and timed accurately by the table motions.

I claim as my invention:

1. In a cutter sharpening machine the combination of, a table reciprocable back and forth and having a rotary spindle adapted to be coupled to a cutter to be sharpened, means for indexing said spindle step by step, a worm wheel rotatably mounted on said table and coupled to said spindle to turn the latter in accordance with the angular displacement of the wheel, a screw meshing with said worm wheel, a slide rotatably supporting said screw and mounted on said table for endwise movement tangentially of said worm wheel and transversely of the table motion, a follower on said slide, a stationary cam extending along said table and engageable with said follower and operable to shift said slide back and forth progressively in the reciprocation of the table and correspondingly turn said worm wheel, a shaft spline coupled to said screw and journaled on said table, a ratchet wheel rotatable with said shaft, a pawl engageable with said ratchet wheel, and means actuated by movement of said table after a plurality of reciprocations of said table and operable to actuate said pawl and turn said screw through a predetermined angle whereby to turn said worm wheel correspondingly.

2. In a cutter sharpening machine the combination of, a table reciprocable back and forth and having a rotary spindle paralleling the table motion and adapted to be coupled to a cutter to be sharpened, means for indexing said spindle, a worm wheel rotatably mounted on said table and coupled to the spindle to turn the latter in accordance with the angular displacement of the wheel, an elongated screw extending tangentially of and meshing with said worm wheel, a slide rotatably supporting said screw and mounted on said table for endwise movement tangentially of said worm wheel and transversely of the table motion, a shaft journaled on said table and spline coupled to said screw, mechanism operable to shift said slide back and forth and turn said worm wheel progressively in unison with the strokes of said table, and mechanism for counting the reciprocations of said table and operable after a plurality of reciprocations of said table to turn said screw through a predetermined angle and thus turn said worm wheel and spindle through a corresponding angle.

3. In a cutter sharpening machine the combination of, a table reciprocable back and forth and having a rotary spindle paralleling the table motion and adapted to be coupled to a cutter to be sharpened, means for indexing said spindle, a worm wheel rotatably mounted on said table to turn on an axis paralleling said spindle and coupled to the latter for turning the spindle, an elongated screw extending tangentially of and meshing with said worm wheel, a slide rotatably supporting said screw and mounted on said table for endwise movement tangentially of said worm wheel and transversely of the table motion, cam means responsive to the motion of said table and operable to shift said slide back and forth and correspondingly turn said worm wheel progressively during reciprocation of said table, a ratchet wheel coupled to said screw, a pawl engageable with said ratchet wheel, and mechanism for counting the reciprocations of said table and operable after a plurality of reciprocations of said table to actuate said pawl and turn said screw through a predetermined angle and thereby turn said worm wheel and spindle through a corresponding angle.

4. A cutter sharpening machine having, in combination, a grinding wheel, a table, a spindle rotatably mounted on said table for rotation with a cutter to be sharpened by said grinding wheel, a power actuator for reciprocating said table to carry said cutter back and forth across said wheel, means for indexing said spindle to present the next row of cutter teeth to said wheel, a worm wheel rotatably mounted on said table and coupled to said spindle, an elongated screw meshing with said worm wheel and mounted on said table for both endwise and rotary movements to correspondingly turn the worm wheel, mechanism operable to reciprocate said screw back and forth in unison with the strokes of said table, mechanism for counting the reciprocations of said table, and means actuated under the control of said counting mechanism after a predetermined number of reciprocations of said table and while said cutter is out of engagement with said wheel to turn said screw, said worm wheel, and said spindle through a predetermined angle.

5. In a cutter sharpening machine the combination of, a table, a spindle rotatably mounted on said table for rotation in unison with a cutter to be sharpened, a power actuator for reciprocating said table back and forth, means for indexing said spindle, a worm wheel rotatably mounted on said table and coupled to said spindle, an elongated screw meshing with said worm wheel and mounted on said table for both endwise and rotary movements to correspondingly turn said worm wheel and spindle, mechanism operable to reciprocate said screw back and forth in unison with the strokes of said table, mechanism for counting the reciprocations of said table, and means actuated under the control of said counting mechanism to turn said screw, said worm wheel, and said spindle through a predetermined angle after a predetermined number of reciprocations of said table.

6. In a cutter sharpening machine the combination of, a table, a spindle rotatably mounted on said table for rotation in unison with a cutter to be sharpened, a power actuator for reciprocating said table back and forth, means for indexing said spindle, a worm wheel rotatably mounted on said table and coupled to said spindle, an elongated screw meshing with said worm wheel and mounted on said table for both endwise and rotary movements, mechanism actuated by the motion of said table and operable to shift said screw endwise back and forth during reciprocation of the table and thereby correspondingly turn said worm wheel and said spindle, and a pawl and ratchet actuated by said table near the end of certain strokes thereof to turn said screw through a predetermined angle and correspondingly turn said worm wheel and said spindle.

7. In a cutter sharpening machine the combination of, a table reciprocable back and forth and having a spindle paralleling the table motion and adapted to be coupled rotatably to a cutter to be sharpened, a worm wheel rotatably mounted on said table and coupled to the spindle, an elongated screw meshing with said worm wheel and mounted on said table for both endwise and a rotary motion relative to the table to thereby correspondingly turn said worm wheel and spindle, means by which said screw may be moved endwise to utilize the screw as a rack in turning said worm wheel and said spindle, and mechanism for counting the reciprocations of said table and operable after a plurality of reciprocations of said table to turn said screw through a predetermined angle and thereby turn said worm wheel and spindle correspondingly.

8. In a cutter sharpening machine the combination of, a table reciprocable back and forth and having a spindle paralleling the table motion and adapted to be coupled to a cutter to be sharpened, a worm wheel rotatably mounted on said table and coupled to the spindle, an elongated screw meshing with said worm wheel and mounted on said table for both endwise and a rotary motion relative to the table, means by which said screw may be moved endwise to utilize the screw as a rack in turning said worm wheel and said spindle, and other means for turning said screw to feed said spindle in more gradual increments.

9. In a cutter sharpening machine the combination of, a table, a spindle rotatably mounted on said table and adapted to be coupled to a cutter to be sharpened, a power actuator for reciprocating said table back and forth, means for indexing said spindle, two members mounted on said table for independent movement relative to the table, means coupling both of said members to said spindle and operable to transmit the independent movements of the members to the spindle, mechanism operable to move one of said members back and forth in unison with the strokes of said table, mechanism for counting the reciprocations of said table, and means actuated under the control of said counting mechanism to move said other member through a predetermined distance after a predetermined number of table reciprocations.

10. In a cutter sharpening machine the combination of, a table, a spindle rotatably mounted on said table and adapted to be coupled to a cutter to be sharpened, a power actuator for reciprocating said table back and forth, means for indexing said spindle, two members mounted on said table for independent movement relative to the table, means coupling both of said members to said spindle and operable to transmit the independent movements of the members to the spindle, cam mechanism actuated by movements of said table and operable to move one of said members, and other mechanism operable by said table to move said other member step by step.

11. In a cutter sharpening machine the combination of, a table, a spindle rotatably mounted on said table and adapted to be coupled to a cutter to be sharpened, a power actuator for reciprocating said table back and forth, an electric motor having stator and rotor elements, one coupled to said spindle, a notched index plate rotatable with said spindle, a member rotatable about the spindle axis and carrying a lug movable into and out of the notches of said plate to lock the spindle and release the same for indexing by said motor, mechanism for counting the reciprocations of said table, and means actuated under the control of said counting mechanism to turn said member through a predetermined angle after a predetermined number of table reciprocations.

12. In a cutter sharpening machine the combination of, a table, a spindle rotatably mounted on said table and adapted to be coupled to a cutter to be sharpened, a power actuator for reciprocating said table back and forth, a member rotatable about the spindle axis, index elements providing between the member and spindle a coupling which is disengageable to permit indexing of said spindle, mechanism for counting the reciprocations of said table, and means actuated under the control of said counting mechanism to turn said member through a predetermined angle after a predetermined number of table reciprocations.

13. In a cutter sharpening machine the combination of, a table, a spindle rotatably mounted on said table and adapted to be coupled to a cutter to be sharpened, a power actuator for reciprocating said table back and forth, means for indexing said spindle in timed relation to the reciprocation of said table, a ratchet wheel rotatably mounted on said table and coupled to said spindle for rotation therewith, a pawl engageable with said wheel and reciprocable back and forth to advance said wheel and spindle step by step, a ratchet rotatably mounted on said table, means normally tending to turn said ratchet to a predetermined angular position, a second pawl engageable with said ratchet, a detent engageable with said ratchet and normally retaining the same against turning toward said position, means actuated in the final portion of each return motion of said table to actuate said second pawl and advance said ratchet one step, means operable after a predetermined number of steps of advance of said ratchet to couple the latter to said first pawl and advance the latter during the succeeding stroke of said second pawl, means operable during said latter stroke to release said retaining detent, and means operated by the motion of said ratchet wheel after a pre-selected number of advances thereof to withdraw said first pawl from engagement with said ratchet wheel.

14. In a cutter sharpening machine the combination of, a table, a spindle rotatably mounted on said table and adapted to be coupled to a cutter to be sharpened, a power actuator for reciprocating said table back and forth, means for indexing said spindle in timed relation to the reciprocation of said table, a ratchet wheel rotatably mounted on said table and coupled to said spindle, a pawl engageable with said wheel and mounted for reciprocation back and forth to advance said spindle step by step, a ratchet rotatably mounted on said table, means normally tending to turn said ratchet to a predetermined angular position, a second pawl engageable with said ratchet, a detent engageable with said ratchet and normally retaining the same against turning toward said position, means actuated in the final portion of each return motion of said table to actuate said second pawl and advance said ratchet one step, means operable after a predetermined number of steps of advance of said ratchet to couple the latter to said first pawl and advance the latter during the succeeding stroke of said second pawl, and means operable during said latter stroke to withdraw said retaining detent and release said ratchet.

15. In a cutter sharpening machine the combination of, a table, a spindle rotatably mounted on said table and adapted to be coupled to a cutter to be sharpened, a power actuator for reciprocating said table back and forth, a ratchet wheel rotatably mounted on said table and coupled to said spindle, a pawl engageable with said wheel and reciprocable back and forth to advance said spindle step by step, a ratchet rotatably mounted on said table, a second pawl engageable with said ratchet, a retaining pawl detent engageable with said ratchet, means actuated in the final portion of each return motion of said table to actuate said second pawl and advance said ratchet one step, and means operable after a predetermined number of steps of advance of said ratchet to couple the latter to said first pawl and advance the latter during the succeeding stroke of said second pawl.

16. In a cutter sharpening machine the combination of, a table, a spindle rotatably mounted on said table and adapted to be coupled to a cutter to be sharpened, a power actuator for reciprocating said table back and forth, means for indexing said spindle in timed relation to the reciprocation of said table, a ratchet wheel rotatably mounted on said table and coupled to said spindle, a reciprocable pawl engageable with said wheel and operable when advanced in one direction to turn said spindle correspondingly, means normally retracting said pawl in the opposite direction, a stop selectively adjustable to vary the extent of retraction of said pawl, a rotary member mounted on said table, means actuated in the final portion of each return motion of said table to advance said member one step, means operable after a predetermined number of steps of advance of said member to couple the latter to said pawl and advance the latter during the succeeding advance of the member, and means operated by the motion of said ratchet wheel after a pre-selected number of advances thereof to withdraw said pawl from engagement with the ratchet wheel.

17. In a cutter sharpening machine the combination of, a table, a spindle rotatably mounted on said table and adapted to be coupled to a cutter to be sharpened, a power actuator for reciprocating said table back and forth, means for indexing said spindle in timed relation to the reciprocation of said table, a ratchet wheel rotatably mounted on said table and coupled to said spindle, a reciprocable pawl engageable with said wheel and operable when advanced in one direction to turn said spindle correspondingly, means normally retracting said pawl in the opposite direction, a rotary member mounted on said table, means actuated in the final portion of each return motion of said table to advance said member one step, means operable after a predetermined number of steps of advance of said member to couple the latter to said pawl and advance the latter during the succeeding advance of the member, and means operated by the motion of said ratchet wheel after a pre-selected number of advances thereof to withdraw said pawl from engagement with the ratchet wheel.

18. In a cutter sharpening machine the combination of, a table, a spindle rotatably mounted on said table and adapted to be coupled to a cutter to be sharpened, a power actuator for reciprocating said table back and forth, a ratchet wheel rotatably mounted on said table and coupled to said spindle, a reciprocable pawl engageable with said wheel and movable back and forth to advance said spindle step by step, a rotary element adapted to be coupled to said wheel for rotation therewith or to be disconnected therefrom for independent turning, means operated by said element after a pre-selected number of advances of said ratchet wheel to withdraw said pawl from engagement with the ratchet wheel, a rotary member mounted on said table, means actuated in the final portion of each return motion of said table to advance said member one step, and means operable after a predetermined number of steps of advance of said member to couple the latter to said pawl and advance the latter during the succeeding advance of the member.

19. In a cutter sharpening machine the combination of, a table reciprocable back and forth, a spindle rotatably mounted on said table and adapted to be coupled to a cutter to be sharpened, a member movably mounted on said table and coupled to said spindle to feed the latter angularly, a ratchet wheel rotatably mounted on said table, a retaining detent engageable with said ratchet wheel, a reciprocable actuating pawl engageable with said ratchet wheel, means actuated in the final portion of each return motion of said table to actuate said pawl and advance said ratchet wheel one step, an indicator wheel rotatable about the axis of said ratchet wheel and adapted to be coupled thereto in different angular positions, spring means normally tending to turn said coupled wheels to a predetermined starting position, means operable after a predetermined number of steps of advance of said ratchet wheel to couple the latter to said member and advance the member and said spindle during the succeeding advancing stroke of said pawl, and means operable during said last-mentioned advance of said ratchet wheel to withdraw said retaining detent and release said ratchet wheel for return to said predetermined position.

20. In a cutter sharpening machine the combination of, a table reciprocable back and forth, a spindle rotatably mounted on said table and adapted to be coupled to a cutter to be sharpened, a ratchet wheel rotatably mounted on said table and operatively connected to said spindle, an actuating pawl engageable with said ratchet wheel and reciprocable back and forth to advance said spindle step by step, means actuated in the final portion of each return motion of said table to actuate said pawl and advance said ratchet wheel one step, a rotary indicator on said table, means providing a coupling between said ratchet and said indicator selectively engageable in different angular positions of the indicator and ratchet wheel, means normally tending to turn said ratchet wheel to a predetermined starting position, and means operable after a predetermined number of steps of advance of said ratchet wheel to couple the latter to said member to advance the latter during the succeeding advancing stroke of said pawl.

JOHN P. SCONE.

REFERENCES CITED

The following references are of record in the file of this patent:

UNITED STATES PATENTS

| Number | Name | Date |
|---|---|---|
| 2,387,166 | Miller | Oct. 16, 1945 |